US012567882B2

(12) United States Patent
Horikoshi et al.

(10) Patent No.: US 12,567,882 B2
(45) Date of Patent: Mar. 3, 2026

(54) ELECTRONIC APPARATUS AND CONTROL METHOD

(71) Applicant: Lenovo (Singapore) Pte. Ltd., Singapore (SG)

(72) Inventors: Hideto Horikoshi, Kanagawa (JP); Keiichi Yoshitomi, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 371 days.

(21) Appl. No.: 18/298,387

(22) Filed: Apr. 11, 2023

(65) Prior Publication Data

US 2023/0379004 A1 Nov. 23, 2023

(30) Foreign Application Priority Data

May 23, 2022 (JP) ................................. 2022-083911

(51) Int. Cl.
 *H04B 5/00* (2024.01)
 *H04B 5/77* (2024.01)
(52) U.S. Cl.
 CPC ..................................... *H04B 5/77* (2024.01)
(58) Field of Classification Search
 CPC ..................................................... H04B 5/77
 See application file for complete search history.

(56) References Cited

U.S. PATENT DOCUMENTS

| | | | | |
|---|---|---|---|---|
| 7,734,307 | B2 * | 6/2010 | Dawidowsky ....... | G06K 7/0008 455/127.1 |
| 8,018,344 | B2 * | 9/2011 | Chang ..................... | H04B 5/48 340/572.1 |
| 8,674,808 | B2 * | 3/2014 | Jantunen .............. | G06K 7/0008 340/10.41 |
| 2008/0084310 | A1 * | 4/2008 | Nikitin ............... | G08B 13/2471 340/572.7 |
| 2008/0090540 | A1 * | 4/2008 | Rofougaran ............. | H04B 5/48 455/289 |
| 2010/0123561 | A1 * | 5/2010 | Nam .................. | G06K 7/10237 340/10.5 |
| 2012/0135681 | A1 * | 5/2012 | Adams ..................... | H04B 5/77 455/41.1 |

(Continued)

FOREIGN PATENT DOCUMENTS

| | | |
|---|---|---|
| JP | 2013-239164 A | 11/2013 |
| JP | 2017-228173 A | 12/2017 |

(Continued)

*Primary Examiner* — Md K Talukder
(74) *Attorney, Agent, or Firm* — Osha Bergman Watanabe & Burton LLP

(57) ABSTRACT

An electronic apparatus is provided including an antenna usable for communications of an RFID and an NFC, an RFID control unit configured to control the communication of the RFID, an NFC control unit configured to control the communication of the NFC, and a control unit configured to control whether to connect either the RFID control unit or the NFC control unit to the antenna. The control unit causes a pre-polling signal of the NFC control unit to be sent out via the antenna and causes the RFID control unit to be connected to the antenna when the control unit detects that a communication partner via the antenna does not perform the communication of the NFC.

8 Claims, 10 Drawing Sheets

100

(56)         References Cited

U.S. PATENT DOCUMENTS

| | | | |
|---|---|---|---|
| 2012/0171952 A1* | 7/2012 | Ohira ............... | H04M 1/72412 |
| | | | 455/41.1 |
| 2014/0148095 A1* | 5/2014 | Smith ................ | H04B 7/0802 |
| | | | 455/41.1 |
| 2014/0148097 A1* | 5/2014 | Kao ......................... | H04B 1/18 |
| | | | 455/41.1 |
| 2015/0126120 A1 | 5/2015 | Chen | |
| 2016/0182130 A1* | 6/2016 | Ahmed ................... | H04B 5/26 |
| | | | 455/41.1 |
| 2017/0272128 A1* | 9/2017 | Tanaka .................... | H04B 5/43 |
| 2020/0021023 A1* | 1/2020 | Ueno .................. | H01Q 1/2258 |
| 2021/0026993 A1* | 1/2021 | Zhang .................... | G06F 21/72 |
| 2023/0021561 A1* | 1/2023 | Xiong .................... | H04B 5/79 |
| 2023/0379004 A1* | 11/2023 | Horikoshi ............... | H04B 5/77 |

FOREIGN PATENT DOCUMENTS

| | | |
|---|---|---|
| JP | 2018-513584 A | 5/2018 |
| JP | 2020-017787 A | 1/2020 |
| WO | 2016/093057 A1 | 6/2016 |

* cited by examiner

ELECTRONIC APPARATUS AND CONTROL METHOD

CROSS-REFERENCE TO RELATED APPLICATIONS

This application claims priority to Japanese Patent Application No. 2022-83911 filed on May 23, 2022, the contents of which are hereby incorporated herein by reference in their entirety.

BACKGROUND OF THE INVENTION

Field of the Invention

The present invention relates to an electronic apparatus and a control method.

Description of the Related Art

An NFC formulated in technical specifications by a standardization organization called an NFC (Near Field Communication) Forum and based on a communication standard established as ISO/IEC14443 is capable of performing communication by using a frequency of 13.56 MHz and at a closer distance of up to about 10 centimeters or less. For example, electronic apparatuses such as laptop and notebook personal computers (PCs) and smart phones include those that support the NFC (for example, Japanese Unexamined Patent Application Publication No. 2020-017787).

Further, some RFIDs (Radio Frequency Identifiers) also use the frequency of 13.56 MHz.

However, the electronic apparatus that supports both NFC and RFID is accompanied by a problem that antennas must be prepared for each even though the same frequency is used.

SUMMARY OF THE INVENTION

One or more embodiments of the invention provide an electronic apparatus which shares an antenna between an NFC and an RFID, and a control method thereof.

According to a first aspect of the present invention, there is provided an electronic apparatus which includes an antenna usable for communications of an RFID (Radio Frequency Identifier) and an NFC (Near Field Communication), an RFID control unit (RFID controller) configured to control the communication of the RFID, an NFC control unit (NFC controller) configured to control the communication of the NFC, and a control unit (controller) configured to control whether to connect either the RFID control unit or the NFC control unit to the antenna, and in which the control unit causes a pre-polling signal of the NFC control unit to be sent out via the antenna and causes the RFID control unit to be connected to the antenna when the control unit detects that a communication partner via the antenna does not perform the communication of the NFC.

Also, in the electronic apparatus according to the first aspect of the present invention, when the RFID control unit is connected to the antenna, the control unit causes the NFC control unit to stop generating the pre-polling signal.

Further, in the electronic apparatus according to the first aspect of the present invention, when the control unit detects the end of communication between the RFID control unit and the communication partner via the antenna, the control unit causes the NFC control unit to be connected to the antenna and causes the NFC control unit to start generating the pre-polling signal.

Yet further, in the electronic apparatus according to the first aspect of the present invention, when the NFC control unit is connected to the antenna, the control unit causes the RFID control unit to stop generating a full-polling signal.

Still further, in the electronic apparatus according to the first aspect of the present invention, the antenna is arranged to be overlapped on a touchpad, and a radio active signal of the RFID control unit or a radio active signal of the NFC control unit is input to a touchpad control unit configured to control the touchpad.

Still further, there is provided an electronic apparatus according to a second aspect of the present invention, which includes an antenna usable for communications of an RFID (Radio Frequency Identifier) and an NFC (Near Field Communication), an RFID control unit (RFID controller) configured to control the communication of the RFID, an NFC control unit (NFC controller) configured to control the communication of the NFC, and a control unit (controller) configured to control whether to connect either the RFID control unit or the NFC control unit to the antenna, and in which the control unit causes a full-polling signal of the RFID control unit to be sent out via the antenna and causes the NFC control unit to be connected to the antenna when the control unit detects the end of the communication of the RFID with a communication partner via the antenna.

Still further, there is provided a control method according to a third aspect of the present invention, which is suitable for an electronic apparatus including an RFID control unit (RFID controller) configured to control communication of an RFID (Radio Frequency Identifier) and an NFC control unit (NFC controller) configured to control communication of an NFC (Near Field Communication), the control method including the steps of causing a pre-polling signal of the NFC control unit to be sent out via an antenna usable for the communications of the RFID and the NFC and causing the RFID control unit to be connected to the antenna when it is detected that a communication partner via the antenna does not perform the communication of the NFC.

Still further, there is provided a control method according to a fourth aspect of the present invention, which is suitable for an electronic apparatus including an RFID control unit (RFID controller) configured to control communication of an RFID (Radio Frequency Identifier) and an NFC control unit (NFC controller) configured to control communication of an NFC (Near Field Communication), the control method including the steps of causing a full-polling signal of the RFID control unit to be sent out via an antenna usable for the communications of the RFID and the NFC and causing the NFC control unit to be connected to the antenna when the end of the communication of the RFID with a communication partner via the antenna is detected.

According to the above-describe aspects of present invention, the electronic apparatus can share the antenna between the NFC and the RFID.

DETAILED DESCRIPTION OF THE INVENTION

First Embodiment

Figure 1:
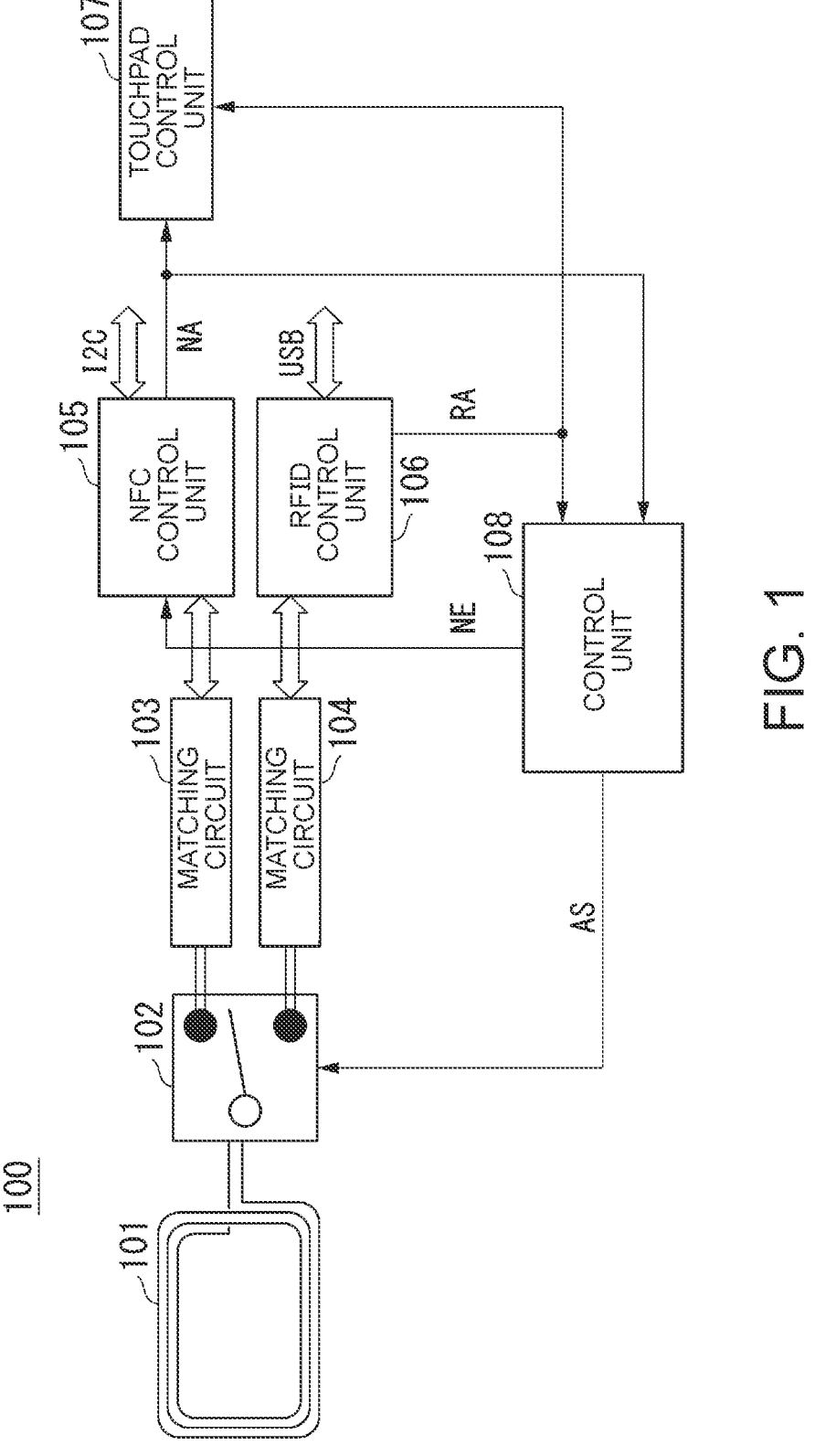
FIG. 1 is a schematic block diagram illustrating a configuration of an electronic apparatus 100 according to a first embodiment of the present invention.

A first embodiment of the present invention will hereinafter be described with reference to the accompanying drawings. FIG. 1 is a schematic block diagram illustrating a configuration of an electronic apparatus 100 according to a first embodiment of the present invention. The electronic apparatus 100 is a personal computer such as a laptop type or a notebook type. The electronic apparatus 100 includes an antenna 101, a switch unit (switch) 102, matching circuits 103 and 104, an NFC control unit (NFC controller) 105, an RFID control unit (RFID controller) 106, a touchpad control unit (touchpad controller) 107, and a control unit (controller) 108.

The antenna 101 is an antenna coil for 13.56 MHz short range communication and is an antenna available for communications of an RFID and an NFC. The antenna 101 is arranged on the back side of an unillustrated touchpad included in the electronic apparatus 100 to overlap with the touchpad. The switch unit 102 is a switch which connects either the matching circuit 103 or 104 to the antenna 101 under the control of the control unit 108. The matching circuit 103 is a matching circuit for connecting the NFC control unit 105 to the antenna 101. The matching circuit 104 is a matching circuit for connecting the RFID control unit 106 to the antenna 101.

The NFC control unit 105 controls the communication of the NFC via the antenna 101. The NFC control unit 105 outputs an NFC radio active signal NA to the control unit 108 and the touchpad control unit 107. The NFC radio active signal NA becomes High while the NFC control unit 105 is outputting a transmission signal to the matching circuit 103, and becomes Low while not outputting. The NFC control unit 105 is connected to a main processor of the electronic apparatus 100 by an I2C (inter-Integrated Circuit) bus or the like.

The RFID control unit 106 controls the communication of the RFID via the antenna 101. The RFID control unit 106 outputs an RFID radio active signal RA to the control unit

108 and the touchpad control unit 107. The RFID radio active signal RA becomes High while the RFID control unit 106 is outputting a transmission signal to the matching circuit 104, and becomes Low while not outputting. The RFID control unit 106 is connected to the main processor of the electronic apparatus 100 by a USB (Universal Serial Bus) or the like. The touchpad control unit 107 controls the touchpad with the antenna 101 disposed on its back side. The touchpad control unit 107 refers to the NFC radio active signal NA and the RFID radio active signal RA when controlling the touchpad to thereby prevent the touchpad from malfunctioning due to communications using the antenna 101.

The control unit 108 controls switching of the switch unit 102 according to an antenna switching signal AS. Thus, the control unit 108 controls whether to connect either the RFID control unit 106 or the NFC control unit 105 to the antenna 101. Further, the control unit 108 outputs to the NFC control unit 105, a permission signal NE which controls permission/non-permission of a pre-polling signal. In the first embodiment, the control unit 108 is a processor different from the main processor of the electronic apparatus 100, but may be the main processor of the electronic apparatus 100.

Figure 2:
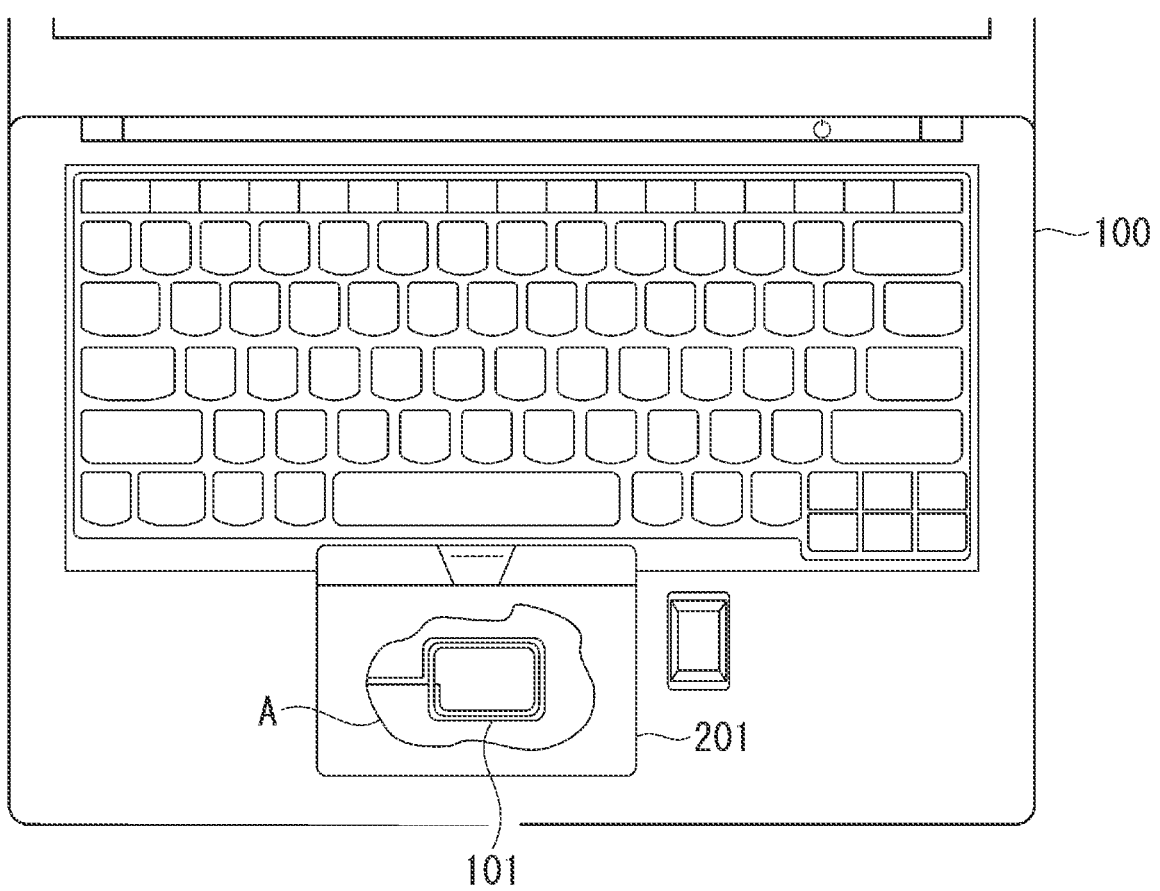
FIG. 2 is an external view illustrating a part of the appearance of the electronic apparatus 100 according to the first embodiment of the present invention.

FIG. 2 is an external view illustrating a part of the appearance of the electronic apparatus 100 according to the first embodiment. The electronic apparatus 100 includes a touchpad 201 and the antenna 101. Since the antenna 101 is arranged within the electronic apparatus 100, it is invisible to the appearance of the electronic apparatus 100. In FIG. 2, a cutoff line A cuts through the touchpad 201 and also illustrates the interior of the electronic apparatus 100. As illustrated in FIG. 2, the antenna 101 is arranged on the back side of the touchpad 201 so that it overlaps with the touchpad 201. The touchpad 201 is comprised of a resin-made panel. Therefore, even if the chassis of the electronic apparatus 100 is made of metal, a magnetic flux radiated from the antenna 101 spreads to the outside of the chassis thereof.

Figure 3:
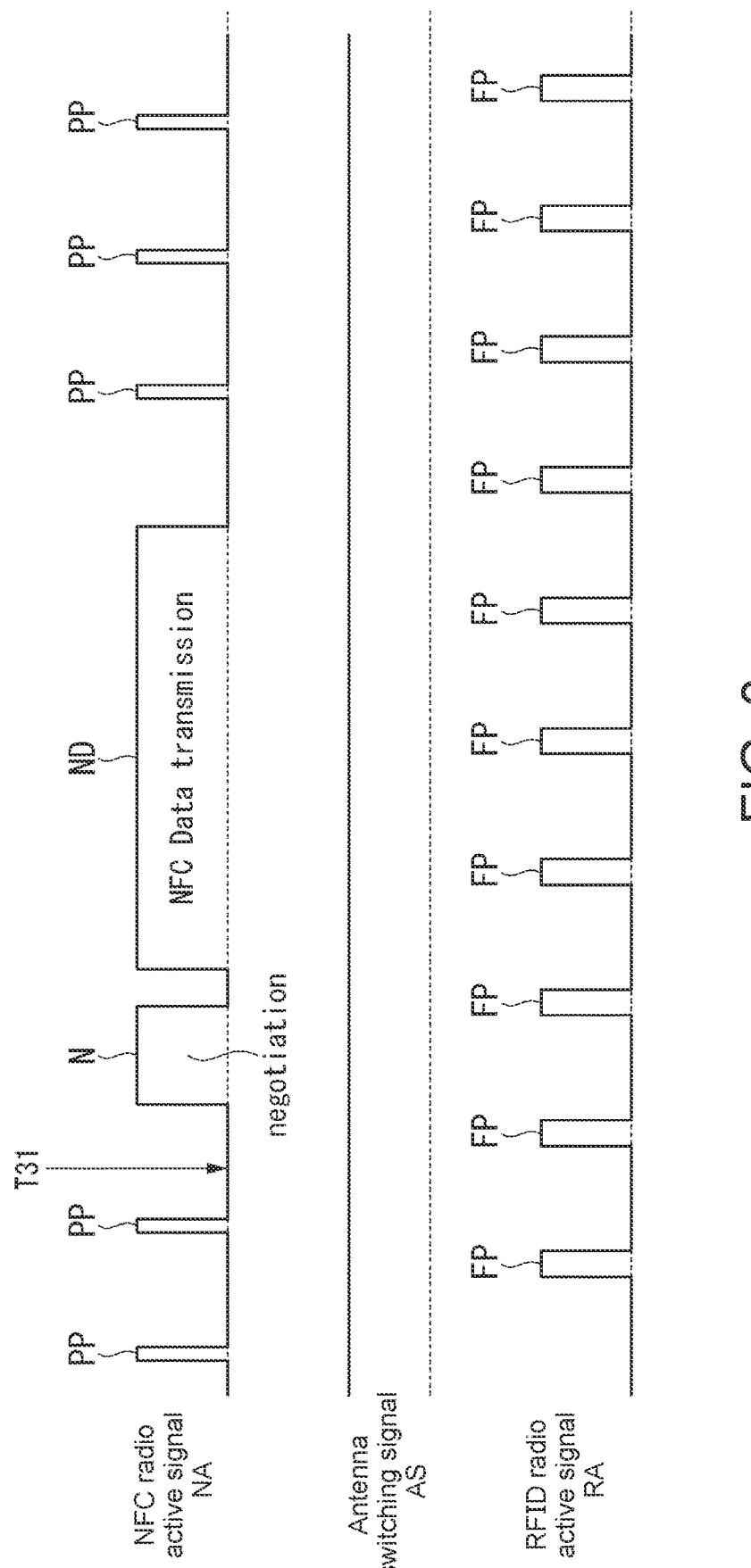
FIG. 3 is a time chart describing a first operation example of the electronic apparatus 100 according to the first embodiment of the present invention.

FIG. 3 is a time chart describing a first operation example of the electronic apparatus 100 according to the first embodiment. FIG. 3 is a time chart illustrating an operation when an NFC card is placed on the touchpad 201 at a timing T31. First, the NFC control unit 105 periodically outputs a pre-polling signal, and the RFID control unit 106 periodically outputs a full-polling signal. Therefore, the NFC radio active signal NA becomes High in a section PP where the pre-polling signal is output, and the RFID radio active signal RA becomes High in a section FP where the full-polling signal is output. The antenna switching signal AS is High, and the switch unit 102 connects the NFC control unit 105 to the antenna 101. Therefore, the pre-polling signal is transmitted from the antenna 101, and the full-polling signal is not transmitted therefrom.

When the NFC card is placed on the touchpad 201 at the timing T31, the NFC control unit 105 and the NFC card performs data communication in a section ND after negotiating in a section N. Thereafter, the NFC control unit 105 periodically outputs a pre-polling signal. During this period, the antenna switching signal AS remains High, and the RFID control unit 106 outputs a full-polling signal periodically (300 ms). Further, the control unit 108 also keeps an unillustrated permission signal NE as a signal indicating permission during this period.

Figure 4:
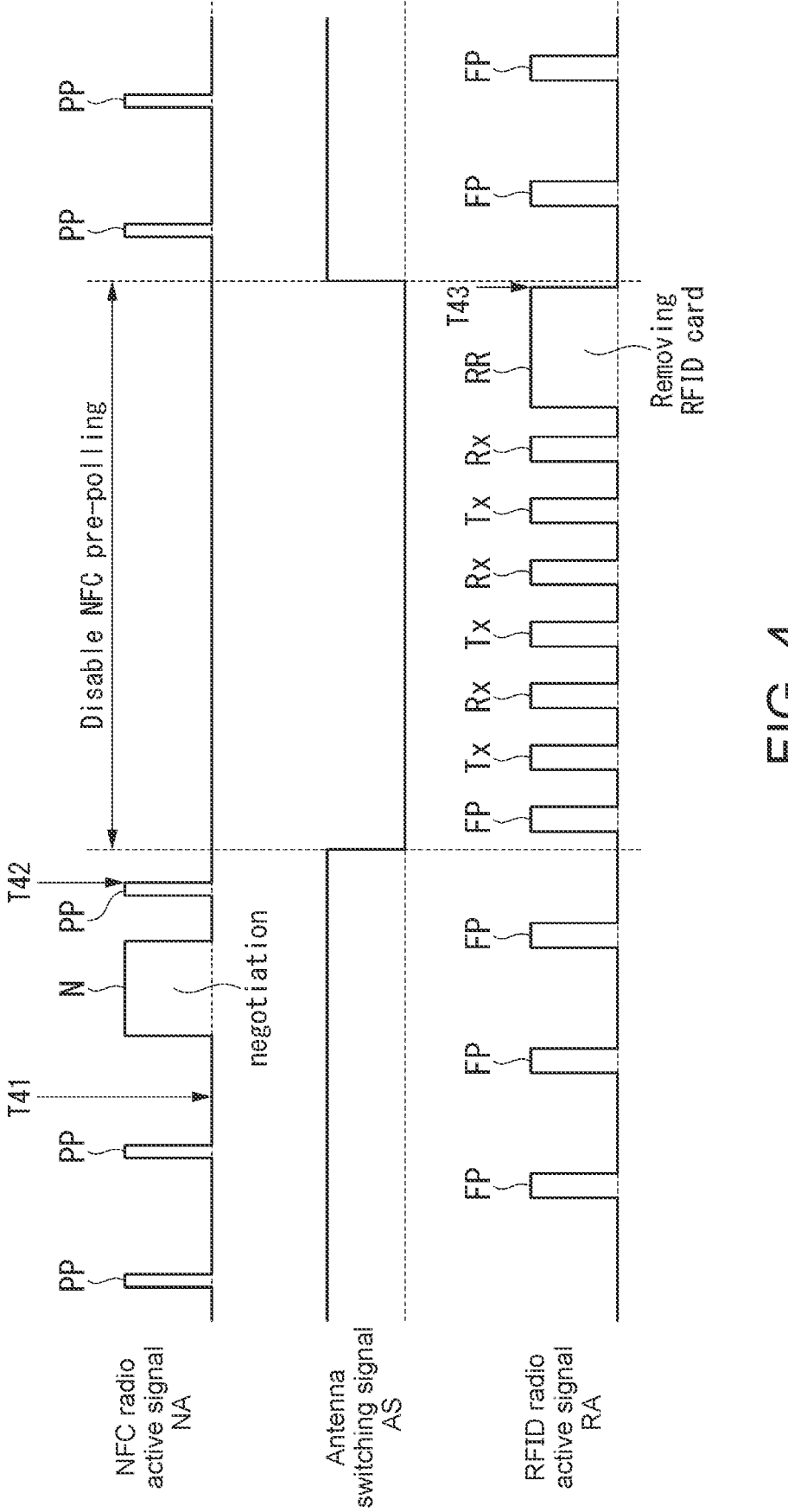
FIG. 4 is a time chart describing a second operation example of the electronic apparatus 100 according to the first embodiment of the present invention.

FIG. 4 is a time chart describing a second operation example of the electronic apparatus 100 according to the first embodiment. FIG. 4 is a time chart illustrating an operation when an RFID card is placed on the touchpad 201 at a timing T41. This drawing is similar to the case of FIG. 3 until the RFID card is placed on the touchpad 201 at the timing T41. When the RFID card is placed on the touchpad 201 at the timing T41, the NFC control unit 105 tries to negotiate with the RFID card during a section N. Since, however, the RFID card does not perform the communication of the NFC, the NFC control unit 105 determines that the negotiation has failed and begins to periodically send out a pre-polling signal again.

The control unit 108 which has been monitoring the NFC radio active signal NA determines that a non-NFC communication partner has been detected at a timing T42, sets the antenna switching signal AS to Low, and sets the permission signal NE to a signal indicating non-permission. As the antenna switching signal AS becomes Low, the switch unit 102 connects the RFID control unit 106 to the antenna 101. Therefore, a pre-polling signal starts to be transmitted from the antenna 101. Further, as the permission signal NE becomes the signal indicating non-permission, the NFC control unit 105 stops outputting the pre-polling signal.

Transmission and reception are repeated in a cycle (150 ms) shorter than that of the full-polling signal between the RFID card having received the full-polling signal sent out from the antenna 101 and the RFID control unit 106. According to the transmission/reception, a transmission section Tx and a reception section Rx during which the RFID radio active signal RA becomes High appear periodically. When the transmission/reception with all RFID cards is completed, the RFID control unit 106 transmits a Removing RFID card of terminating communication with the RFID card. A transmission section RR of the Removing RFID card is 100 ms or more longer than the transmission section Tx and the reception section Rx.

The control unit 108 which has been monitoring the RFID radio active signal RA detects the end of the communication of the RFID at a timing T43 according to the transmission section RR. In response to this detection, the control unit 108 makes the antenna switching signal AS Low and sets the permission signal NE to the signal indicating permission. As a result, returning to the initial state of FIG. 4, the switch unit 102 connects the NFC control unit 105 to the antenna 101, and the NFC control unit 105 resumes sending a pre-polling signal.

Figure 5:
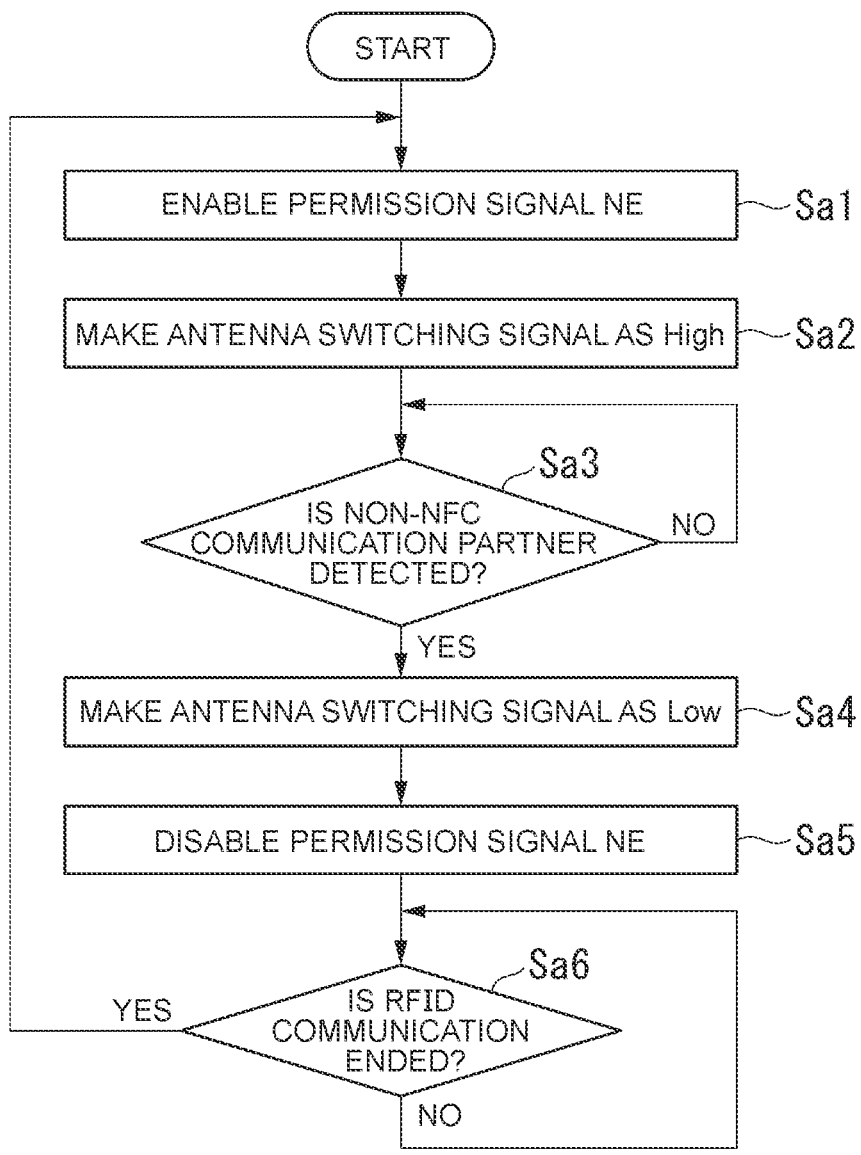
FIG. 5 is a flowchart describing the operation of a control unit (controller) 108 in the first embodiment of the present invention.

FIG. 5 is a flowchart describing the operation of the control unit 108 in the first embodiment. First, the control unit 108 enables the permission signal NE (Step Sa1) to permit the NFC control unit 105 to send out the pre-polling signal. Next, the control unit 108 makes the antenna switching signal AS High (Step Sa2) to control the switch unit 102 to connect the NFC control unit 105 to the antenna 101.

Next, the control unit 108 waits until it detects a non-NFC communication partner (Step Sa3—No). During this period, the NFC control unit 105 may communicate with the NFC card, but may attempt to communicate with the non-NFC communication partner. When the control unit 108 detects the non-NFC communication partner (Step Sa3—Yes), the control unit 108 makes the antenna switching signal AS Low (Step Sa4) to control the switch unit 102 to connect the RFID control unit 106 to the antenna 101. Further, the control unit 108 disables the permission signal NE (Step Say) to cause the NFC control unit 105 to stop sending out the pre-polling signal. Next, the control unit 108 waits until it detects the end of the communication of the RFID (Step Sa6—No). During this period, the RFID control unit 106 may communicate with the RFID card, but may attempt to communicate with a communication partner that is neither NFC nor RFID. When the control unit 108 detects the end of the communication of the RFID (Step Sa6—Yes), the control unit 108 returns to Step Sa1.

Thus, the electronic apparatus 100 includes the antenna 101 usable for the communications of the RFID and NFC, the RFID control unit 106 which controls the communication of the RFID, the NFC control unit 105 which controls the communication of the NFC, and the control unit 108 controls whether to connect either the RFID control unit 106 or the NFC control unit 105 to the antenna 101. The control unit 108 causes the pre-polling signal of the NFC control unit 105 to be sent out through the antenna 101 and causes the RFID control unit 106 to be connected to the antenna 101 when it detects that the communication partner via the antenna 101 does not perform the communication of the NFC. Consequently, the electronic apparatus 100 is capable of sharing the antenna 101 between the NFC and RFID.

Further, when the RFID control unit 106 is connected to the antenna 101, the control unit 108 causes the NFC control unit 105 to stop generating the pre-polling signal. Therefore, it is possible to suppress power consumption due to the generation of the pre-polling signal of the NFC control unit 105.

Second Embodiment

In the first embodiment, the placing of the NFC card or the RFID card on the touchpad 201 was kept on standby in the state in which the pre-polling signal of the NFC control unit 105 was sent out. In the second embodiment, the placing of the NFC card or the RFID card on the touchpad 201 is kept on standby in the state in which the full-polling signal of the RFID control unit 106 is sent out. The configuration of the electronic apparatus 100 according to the second embodiment is similar to that in FIG. 1, but the operation of the control unit 108 differs.

Figure 6:
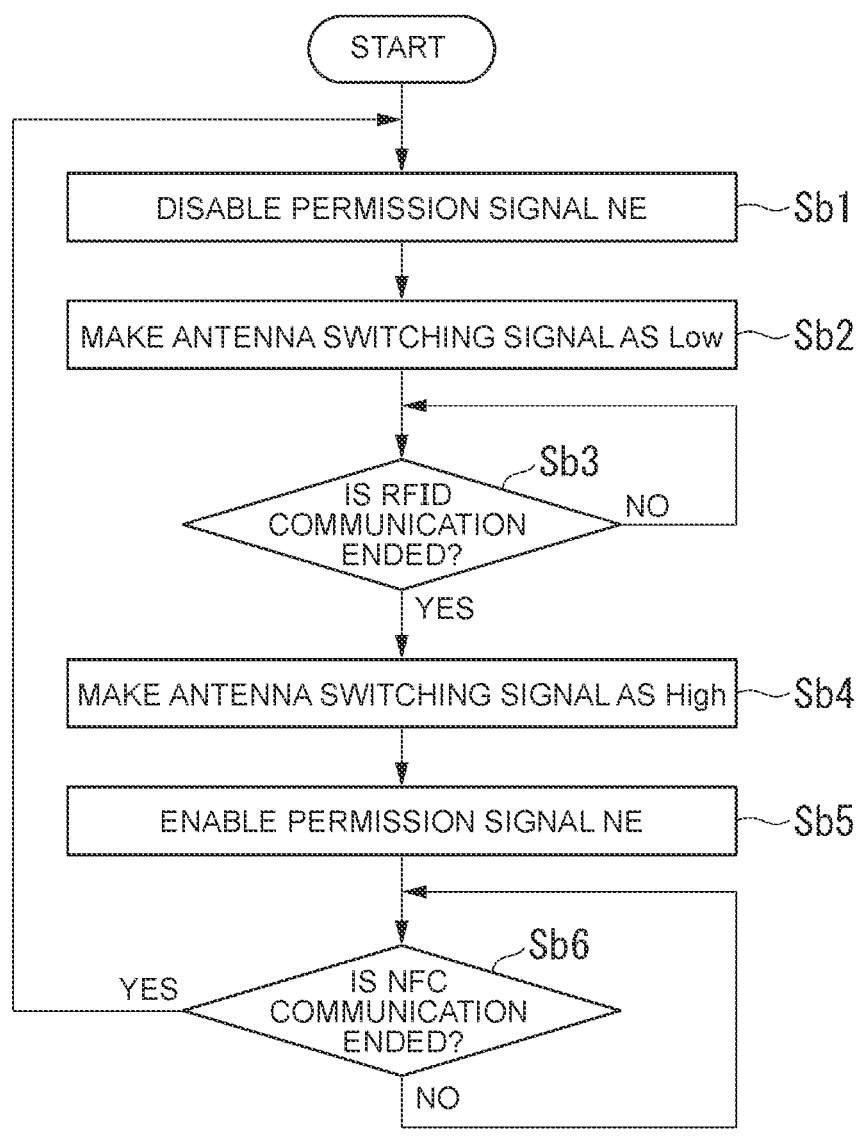
FIG. 6 is a flowchart describing the operation of a control unit (controller) 108 in a second embodiment of the present invention.

FIG. 6 is a flowchart describing the operation of the control unit 108 in the second embodiment of the present invention. First, the control unit 108 disables a permission signal NE (Step Sb1) to cause the NFC control unit 105 to stop sending out a pre-polling signal. Next, the control unit 108 makes an antenna switching signal AS Low (Step Sb2) to control the switch unit 102 to connect the RFID control unit 106 to the antenna 101.

Next, the control unit 108 waits until the communication of the RFID is ended (Step Sb3—No). During this period, the RFID control unit 106 may communicate with the RFID card, but may attempt to communicate with the non-RFID communication partner. When the control unit 108 detects the end of the communication of the RFID (Step Sb3—Yes), the control unit 108 makes the antenna switching signal AS High (Step Sb4) to control the switch unit 102 to connect the NFC control unit 105 to the antenna 101. Further, the control unit 108 enables the permission signal NE (Step Sb5) to cause the NFC control unit 105 to start sending out a pre-polling signal. Next, the control unit 108 waits until it detects the end of the communication of the NFC (Step Sb6—No). During this period, the NFC control unit 105 may communicate with the NFC card, but may attempt to communicate with a communication partner that is neither NFC nor RFID. When the control unit 108 detects the end of the communication of the RFID (Step Sb6—Yes), the control unit 108 returns to Step Sb1.

Thus, the electronic apparatus 100 according to the second embodiment is similar in configuration to the first embodiment. However, the control unit 108 causes the full-polling signal of the RFID control unit 106 to be sent out via the antenna 101 and causes the NFC control unit 105 to be connected to the antenna 101 when it detects that the communication partner via the antenna 101 does not perform the communication of the RFID. Consequently, the electronic apparatus 100 is capable of sharing the antenna 101 between the NFC and RFID.

Third Embodiment

In the first and second embodiments, the permission/non-permission of the pre-polling signal was notified to the NFC control unit 105 by the permission signal NE. In the third embodiment, the permission/non-permission of a full-polling signal is notified to an RFID control unit (RFID control) 106a by a permission signal RE.

Figure 7:
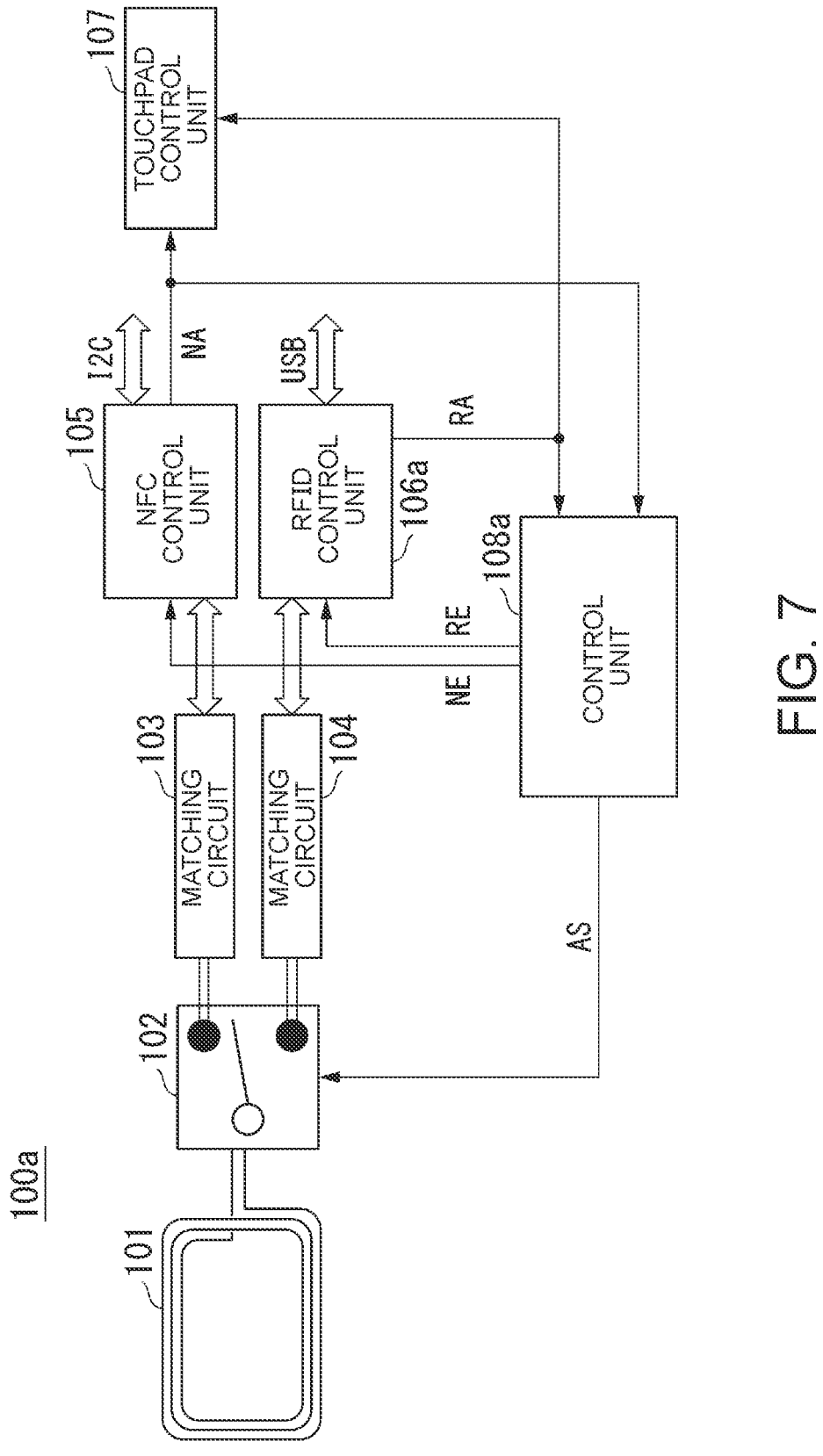
FIG. 7 is a schematic block diagram illustrating a configuration of an electronic apparatus 100*a* according to a third embodiment of the present invention.

FIG. 7 is a schematic block diagram illustrating a configuration of an electronic apparatus 100a according to the third embodiment of the present invention. In FIG. 7, the same reference numerals are assigned to the same parts as those in FIG. 1, and the description thereof will be omitted. The electronic apparatus 100a is different from the electronic apparatus 100 illustrated in FIG. 1 in that a control unit (controller) 108a and an RFID control unit (RFID controller) 106a are provided in place of the control unit 108 and the RFID control unit 106, but is otherwise similar thereto.

The control unit 108a is similar to the control unit 108, but is different therefrom in that it outputs the permission signal RE which notifies the RFID control unit 106a of the permission/non-permission of the full-polling signal. The RFID control unit 106a is similar to the RFID control unit 106, but is different therefrom in that it controls the generation of the full-polling signal in response to the permission/non-permission of the permission signal RE.

Figure 8:
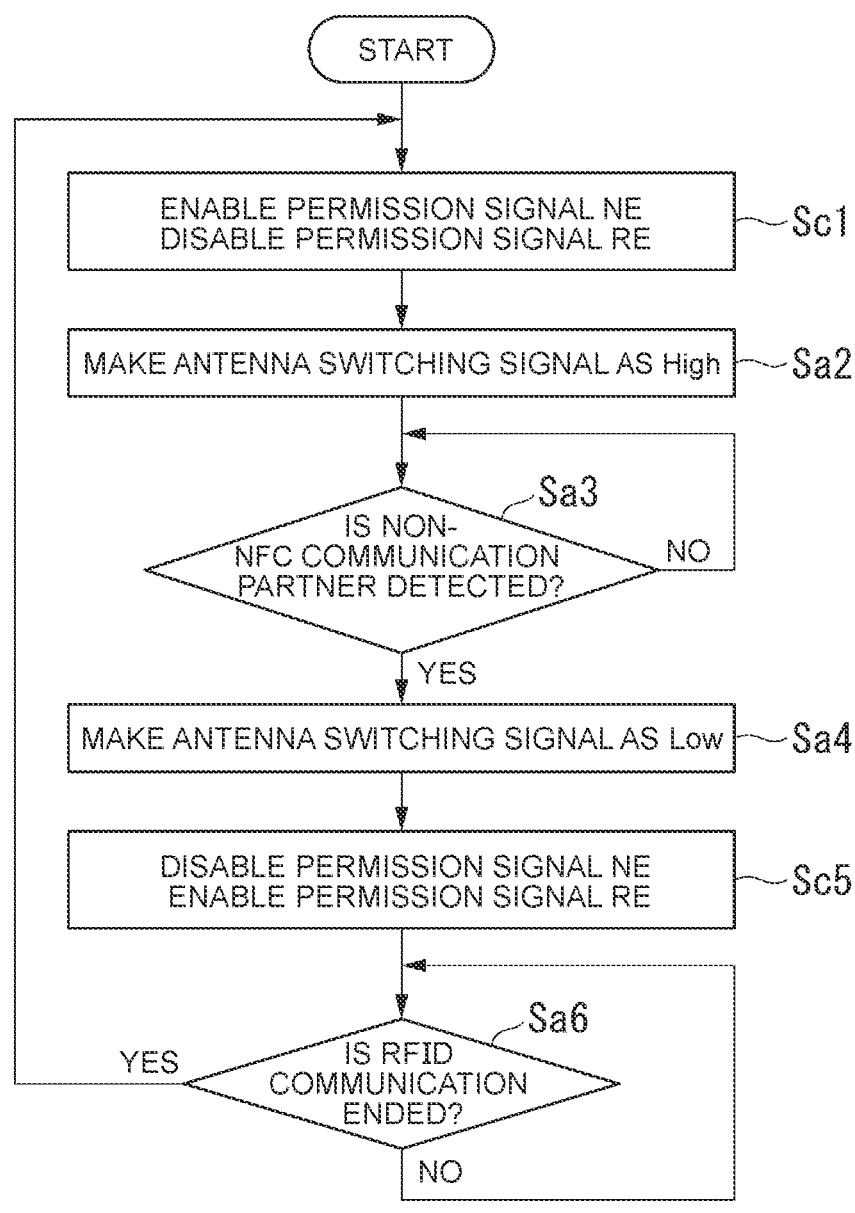
FIG. 8 is a flowchart describing the operation of a control unit (controller) 108*a* in the third embodiment of the present invention.

FIG. 8 is a flowchart describing the operation of the control unit 108a in the third embodiment. In FIG. 8, the same reference numerals are assigned to the same Steps as those in FIG. 5, and the description thereof will be omitted. The flowchart of FIG. 8 is different from that of FIG. 5 in that it includes Steps Sc1 and Sc5 in place of Steps Sa1 and Say.

In Step Sc1, the control unit 108a enables a permission signal NE and disables the permission signal RE. Consequently, the NFC control unit 105 is permitted to send out a pre-polling signal, and the RFID control unit 106a stops the generation of the full-polling signal. Further, in Step Sc5, the control unit 108a disables the permission signal NE and enables the permission signal RE. Consequently, the NFC control unit 105 stops the generation of the pre-pooling signal, and the RFID control unit 106a is permitted to send out the full-polling signal.

Thus, when the NFC control unit 105 is connected to the antenna 101, the control unit 108a causes the RFID control unit 106a to stop generating the full-polling signal. With this, it is, therefore, possible to suppress power consumption due to the generation of the full-polling signal from the RFID control unit 106a.

Incidentally, even in the third embodiment as in the second embodiment, the placing of an NFC card or an RFID card on the touchpad 201 may be kept on standby in the state in which the full-polling signal of the RFID control unit 106a is sent out.

Further, instead of the control unit 108a, the control unit 108 may be provided to input the permission signal NE to the RFID control unit 106a. When the permission signal NE indicates permission, the RFID control unit 106a stops the generation of the full-polling signal, and when the permission signal NE indicates non-permission, the RFID control unit 106a sends out the full-polling signal.

Fourth Embodiment

Figure 9:
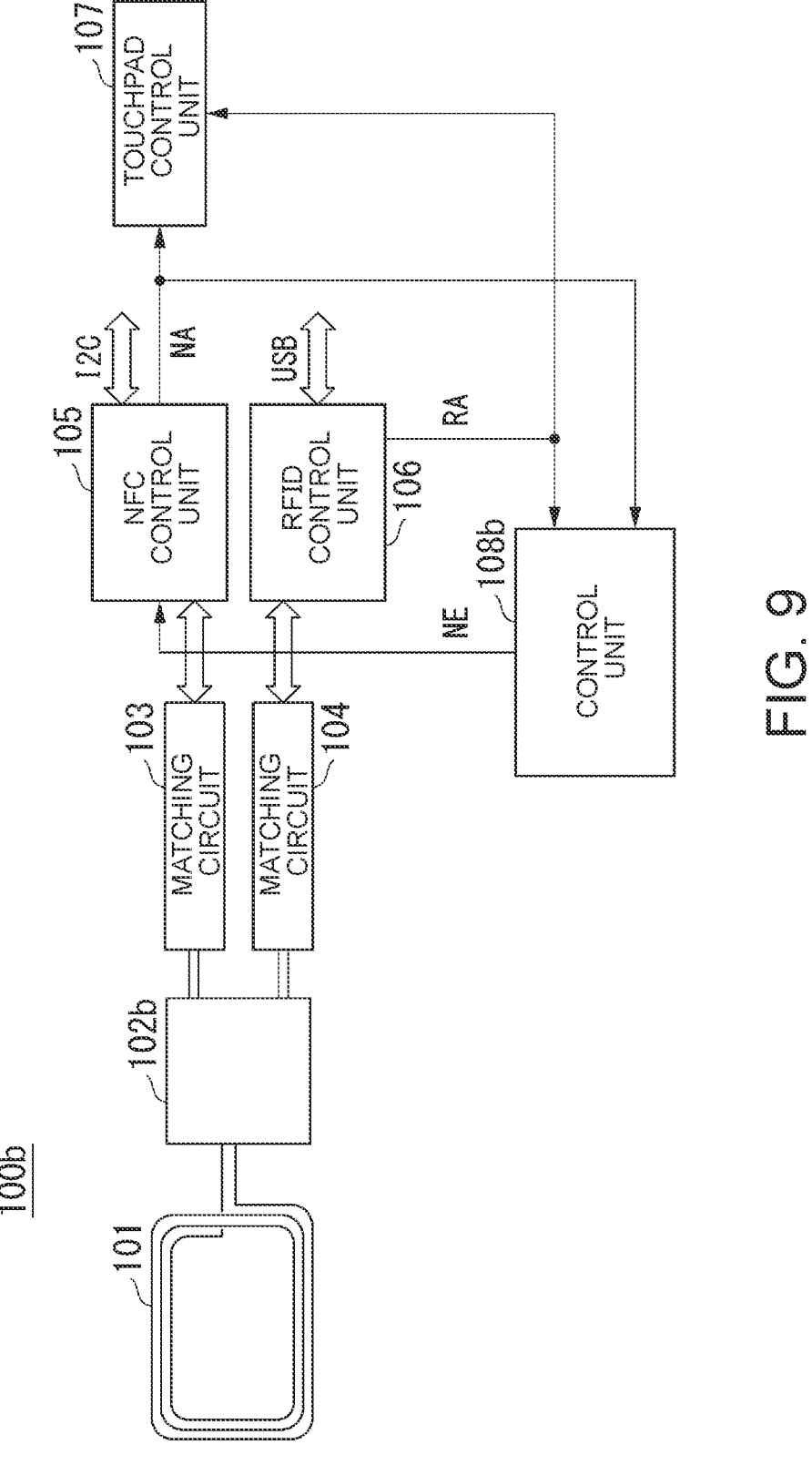
FIG. 9 is a schematic block diagram illustrating a configuration of an electronic apparatus 100*b* according to a fourth embodiment of the present invention.

The switch unit 102 was used in the first to third embodiments. In the fourth embodiment, a divider 102b is used. FIG. 9 is a schematic block diagram illustrating a configuration of an electronic apparatus 100b according to the fourth embodiment of the present invention. In FIG. 9, the same reference numerals are assigned to the same parts as those in FIG. 1, and the description thereof will be omitted. The electronic apparatus 100b differs from the electronic apparatus 100a in that the divider 102b and a control unit (controller) 108b are provided instead of the switch unit 102 and the control unit 108, but is otherwise similar thereto.

The divider 102b inputs a signal from the NFC control unit 105 via the matching circuit 103 and a signal from the RFID control unit 106 via the matching circuit 104 to the antenna 101. Further, the divider 102b divides a signal received by the antenna 101 and inputs the same to the NFC control unit 105 via the matching circuit 103 and the RFID control unit 106 via the matching circuit 104.

The control unit 108b is different from the control unit 108 in that it does not output the antenna switching signal AS, but is otherwise similar thereto.

Thus, even if the divider 102b is used instead of the switch unit 102, the antenna 101 can be shared in a manner similar to the first embodiment. It should be noted that in place of the switch unit 102, the divider 102b may be used similarly even in other embodiments.

Fifth Embodiment

Figure 10:
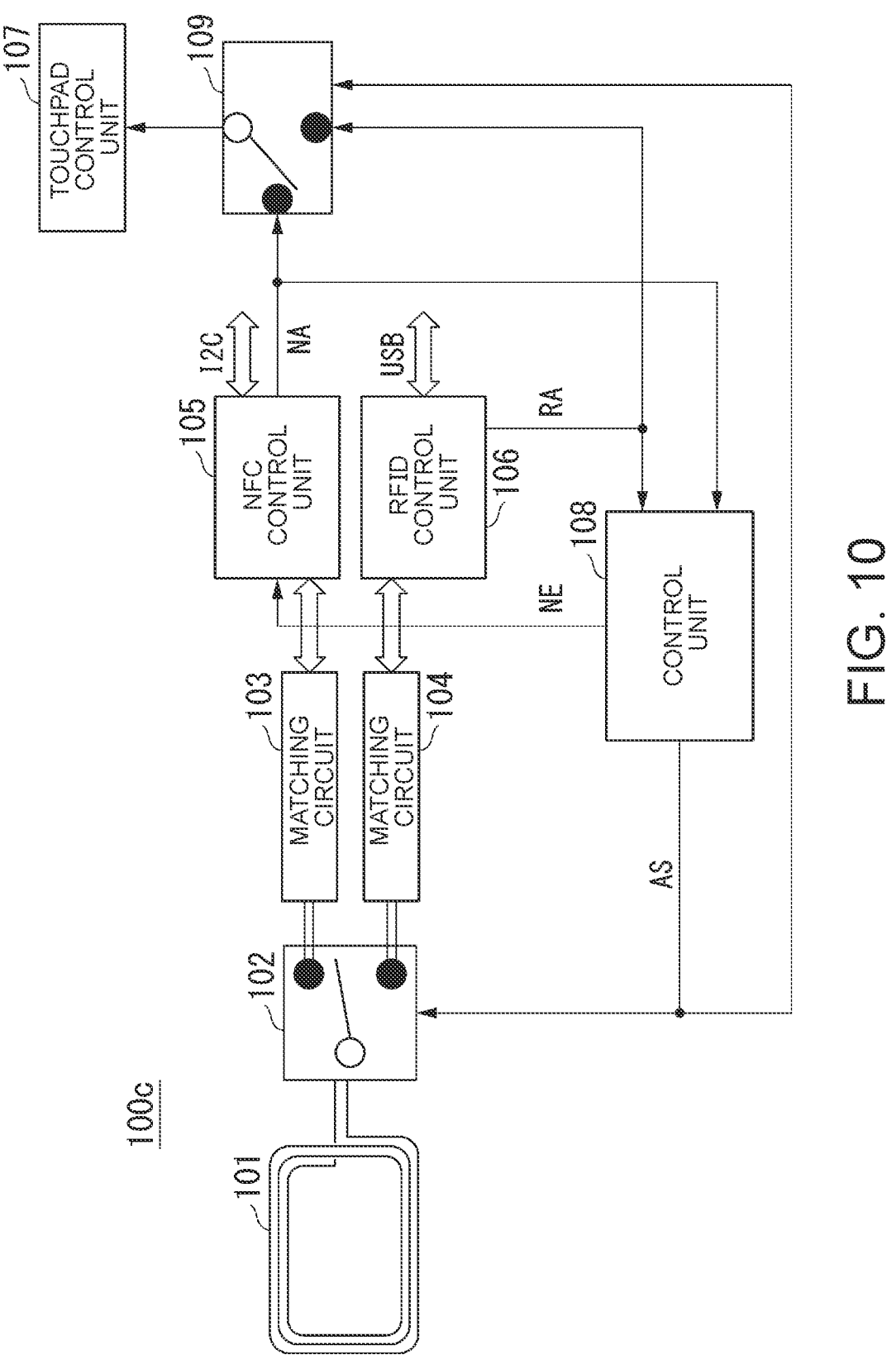
FIG. 10 is a schematic block diagram illustrating a configuration of an electronic apparatus 100*c* according to a fifth embodiment of the present invention.

In the fifth embodiment, a switch unit (switch) 109 is provided to also control the input of an NFC radio active signal NA and an RFID radio active signal RA to a touchpad control unit (touchpad controller) 107. FIG. 10 is a schematic block diagram illustrating a configuration of an electronic apparatus 100c according to the fifth embodiment of the present invention. In FIG. 10, the same reference numerals are assigned to the same parts as those in FIG. 1, and the description thereof will be omitted. The electronic apparatus 100c is different from the electronic apparatus 100 in FIG. 1 in that it has the switch unit 109, and is otherwise similar thereto.

The switch unit 109 controls whether to input either the NFC radio active signal NA or the RFID radio active signal RA to the touchpad control unit 107. This control is performed by an antenna switching signal AS. That is, when the antenna switching signal AS is High, the switch unit 109 inputs the NFC radio active signal NA to the touchpad control unit 107. When the antenna switching signal AS is Low, the switch unit 109 inputs the RFID radio active signal RA to the touchpad control unit 107.

Thus, when the NFC control unit 105 is connected to the antenna 101, the NFC radio active signal NA is input to the touchpad control unit 107. Further, when the RFID control unit 106 is connected to the antenna 101, the RFID radio active signal RA is input to the touchpad control unit 107. Therefore, the time during which communication using the antenna 101 is performed, and the time when the signal input to the touchpad control unit 107 becomes High comes to coincide. It should be noted that the switch unit 109 may be used similarly even in the first to third embodiments.

In the respective embodiments described above, the control units 108, 108a, and 108b may perform the detection of the non-NFC communication partner, the detection of the end of the communication of the NFC, and the detection of the end of the communication of the RFID as follows. The control units 108, 108*a*, and 108*b* monitor the High/Low levels and rising/falling edges of the NFC radio active signal NA and the RFID radio active signal RA to thereby monitor the pulse widths and pulse periods of these signals.

When a pulse width not exceeding 100 ms is detected after the pulse width of the NFC radio active signal NA becomes 60 ms, it is determined that a non-NFC communication partner has been detected. When a pulse having a pulse width exceeding 100 ms is detected and the falling edge of the pulse is detected after the pulse width of the NFC radio active signal NA becomes 60 ms, it is determined that the end of the communication of the NFC has been detected. In the RFID communication, the pulses of the RFID radio active signal RA illustrated in FIG. 4 are sent out even in the case of the non-RFID communication partner. When a pulse having a pulse width exceeding 100 ms is detected and the falling edge of the pulse is detected after the pulse period of the RFID radio active signal RA changes from 300 ms to 150 ms, or when a predetermined time has elapsed after the pulse period changes from 300 ms to 150 ms, it is determined that the end of the communication of the RFID has been detected.

Further, the control units 108, 108*a*, and 108*b* may be implemented by recording a program for realizing the functions of the control units 108, 108*a*, and 108*b* in FIGS. 1, 7, 9, and 10 in a computer-readable recording medium, reading the program recorded therein by a computer system, and executing the same. It should be noted that the "computer system" referred to here includes an OS and hardware such as peripheral devices.

Besides, the "computer-readable recording medium" refers to a portable medium such as a flexible disk, a magneto optical disk, a ROM, a CD-ROM or the like and a storage device such as a hard disk incorporated in the computer system. Further, the "computer-readable recording medium" includes a medium that dynamically holds a program for a short period of time as in a communication line where a program is transmitted via a network such as Internet or a communication line such as a telephone line, and a medium that holds a program for a certain period of time as in a volatile memory provided inside the computer system which serves as a server or a client in that case. In addition, the above-described program may be for realizing a part of the aforementioned functions, and additionally may be one that can realize the above-described functions in combination with the program already recorded in the computer system.

Also, each functional block of the above-described electronic apparatuses 100, 100*a*, 100*b*, and 100*c* in FIGS. 1, 7, 9, and 10 may be chipped individually, or some or all thereof may be integrated into a chip. The method of circuit integration is not limited to an LSI and may be realized by a dedicated circuit or a general-purpose processor. Either hybrid or monolithic may be taken. Some of them may implement their functions by hardware, or may implement their functions by software.

Further, when technologies such as circuit integration that replaces the LSI appear with advances in semiconductor technology, it is also possible to use integrated circuits according to the technologies.

As described above, although each of the embodiments of the present invention has been described in detail with reference to the drawings, the specific configuration is not limited to this embodiment, and also includes design changes and the like within the scope not departing from the gist of the present invention.

DESCRIPTION OF SYMBOLS

100, 100*a*, 100*b*, 100*c* electronic apparatus
101 antenna
102, 109 switch
102*b* divider
103, 104 matching circuit
105 NFC control unit
106 RFID control unit
107 touchpad control unit
108, 108*a* control unit
201 touchpad

What is claimed:

1. An electronic apparatus, comprising:
an antenna usable for communications of an RFID (Radio Frequency Identifier) and an NFC (Near Field Communication);
an RFID controller that controls communication of the RFID;
an NFC controller that controls communication of the NFC; and
a controller that controls whether to connect either the RFID controller or the NFC controller to the antenna,
wherein the controller causes a pre-polling signal of the NFC controller to be sent out via the antenna and causes the RFID controller to be connected to the antenna when the controller detects that a communication partner via the antenna does not perform the communication of the NFC.

2. The electronic apparatus according to claim 1, wherein when the RFID controller is connected to the antenna, the controller causes the NFC controller to stop generating the pre-polling signal.

3. The electronic apparatus according to claim 2, wherein when the controller detects an end of communication between the RFID controller and the communication partner via the antenna, the controller causes the NFC controller to be connected to the antenna and causes the NFC controller to start generating the pre-polling signal.

4. The electronic apparatus according to claim 1, wherein when the NFC controller is connected to the antenna, the controller causes the RFID controller to stop generating a full-polling signal.

5. The electronic apparatus according to claim 1, wherein the antenna is arranged to be overlapped on a touchpad, and wherein a radio active signal of the RFID controller or a radio active signal of the NFC controller is input to a touchpad controller that controls the touchpad.

6. An electronic apparatus, comprising:
an antenna usable for communications of an RFID (Radio Frequency Identifier) and an NFC (Near Field Communication);
an RFID controller that controls communication of the RFID;
an NFC controller that controls communication of the NFC; and
a controller that controls whether to connect either the RFID controller or the NFC controller to the antenna,
wherein the controller causes a full-polling signal of the RFID controller to be sent out via the antenna and causes the NFC controller to be connected to the antenna when the controller detects an end of a communication of the RFID with a communication partner via the antenna.

7. A control method suitable for an electronic apparatus including an RFID controller that controls communication of an RFID (Radio Frequency Identifier) and an NFC controller that controls communication of an NFC (Near Field Communication), the control method comprises:

causing a pre-polling signal of the NFC controller to be sent out via an antenna usable for communications of the RFID and the NFC; and causing the RFID controller to be connected to the antenna when it is detected that a communication partner via the antenna does not perform the communication of the NFC.

8. A control method suitable for an electronic apparatus including an RFID controller that controls communication of an RFID (Radio Frequency Identifier) and an NFC controller that controls communication of an NFC (Near Field Communication), the control method comprises:

causing a full-polling signal of the RFID controller to be sent out via an antenna usable for communications of the RFID and the NFC; and causing the NFC controller to be connected to the antenna when an end of the communication of the RFID with a communication partner via the antenna is detected.

* * * * *